United States Patent
Han et al.

(10) Patent No.: US 10,792,978 B2
(45) Date of Patent: Oct. 6, 2020

(54) VEHICLE SENSOR ASSEMBLY FOR DETECTING SOLAR RADIATION AND AIR CONDITIONING SYSTEM HAVING THE SAME

(71) Applicants: Hyundai Motor Company, Seoul (KR); Kia Motors Corporation, Seoul (KR); Omron Automotive Electronic Korea Co., Ltd, Anseong-si (KR)

(72) Inventors: Kwang-Ok Han, Seoul (KR); Yong-Chul Kim, Hwaseong-si (KR); Gyu-Suk Han, Hwaseong-si (KR); Kwang-Joon Han, Seongnam-si (KR); Sang-Hyun Kim, Anseong-si (KR); Jang-Won Lee, Anyang-Si (KR)

(73) Assignees: Hyundai Motor Compnay, Seoul (KR); Kia Motors Corporation, Seoul (KR); Omron Automotive Electronic Korea Co., Ltd., Anseong-si (KR)

( * ) Notice: Subject to any disclaimer, the term of this patent is extended or adjusted under 35 U.S.C. 154(b) by 216 days.

(21) Appl. No.: 15/856,903

(22) Filed: Dec. 28, 2017

(65) Prior Publication Data
US 2018/0229579 A1    Aug. 16, 2018

(30) Foreign Application Priority Data
Feb. 14, 2017    (KR) .................. 10-2017-0019883

(51) Int. Cl.
| G01J 1/20 | (2006.01) |
| B60H 1/00 | (2006.01) |
| G01J 1/42 | (2006.01) |
| G01J 1/02 | (2006.01) |

(52) U.S. Cl.
CPC .......... *B60H 1/0075* (2013.01); *G01J 1/0242* (2013.01); *G01J 1/0271* (2013.01); *G01J 1/4228* (2013.01); *G01J 2001/4266* (2013.01)

(58) Field of Classification Search
CPC ...... G01J 1/0271; G01J 1/0242; G01J 1/4228; B60H 1/0075
USPC ..................................... 250/203.4
See application file for complete search history.

(56) References Cited

U.S. PATENT DOCUMENTS

| 5,072,106 | A | * | 12/1991 | Osawa | B60H 1/0075 |
| | | | | | 250/206.1 |
| 5,153,429 | A | | 10/1992 | Takahashi | |
| 5,957,375 | A | * | 9/1999 | West | B60H 1/0075 |
| | | | | | 126/578 |
| 6,185,950 | B1 | | 2/2001 | Baruschke et al. | |
| 7,115,850 | B2 | | 10/2006 | Niemann et al. | |

(Continued)

FOREIGN PATENT DOCUMENTS

| JP | 6-15288 B2 | 3/1994 |
| KR | 10-2005-0093133 A | 9/2005 |
| KR | 10-0565770 B1 | 3/2006 |

*Primary Examiner* — Georgia Y Epps
*Assistant Examiner* — Kevin Wyatt
(74) *Attorney, Agent, or Firm* — Morgan, Lewis & Bockius LLP (57) ABSTRACT

A vehicle detector assembly for detecting solar radiation may include a housing, a fixed plate fixed to an upper surface of the housing in a flat form, a plurality of photo detectors bonded to a surface of the fixed plate, each being connected to a lead having a uniform one-directional inclination structure, and a detector cap fastened to the housing and transmitting sunlight.

16 Claims, 5 Drawing Sheets

(56) References Cited

U.S. PATENT DOCUMENTS

| | | | | |
|---|---|---|---|---|
| 7,546,766 B2* | 6/2009 | Jeitner | ........................ | G01J 1/02 |
| | | | | 73/170.27 |
| 2002/0047085 A1* | 4/2002 | Sumiya | ...................... | G01J 1/04 |
| | | | | 250/203.4 |
| 2005/0161581 A1* | 7/2005 | Michiyama | ................ | G01J 1/04 |
| | | | | 250/203.4 |
| 2006/0268262 A1* | 11/2006 | Maldziunas | .......... | B60H 1/0075 |
| | | | | 356/221 |
| 2008/0000792 A1* | 1/2008 | Koch | ......................... | A61J 7/04 |
| | | | | 206/459.5 |

* cited by examiner

VEHICLE SENSOR ASSEMBLY FOR DETECTING SOLAR RADIATION AND AIR CONDITIONING SYSTEM HAVING THE SAME

CROSS-REFERENCE(S) TO RELATED APPLICATIONS

The present application claims priority to Korean Patent Application No. 10-2017-0019883, filed on Feb. 14, 2017, the entire contents of which is incorporated herein for all purposes by this reference.

BACKGROUND OF THE INVENTION

Field of the Invention

The present invention relates to a vehicle detector assembly for detecting solar radiation; and, more particularly, the present invention relates to a vehicle detector assembly for detecting solar radiation, which has a mold structure to protect devices, and an air conditioning system having the same.

Furthermore, the present invention relates to a vehicle detector assembly for detecting solar radiation, which has an inclined lead structure, and an air conditioning system having the same.

Description of Related Art

In general, a vehicle air conditioning system performs solar radiation control to condition an internal of a vehicle colder when a quantity of solar radiation detected in the daytime is large. The vehicle air conditioning system controls wind velocity and/or various opening amounts of temperature regulation doors to generate a quantity of discharge heat corresponding to a temperature value which is determined by a driver from an equation of quantity of discharge heat using various types of detector information including internal and external air temperatures.

To control the solar radiation, there is used a detector assembly for detecting solar radiation. The detector assembly typically may include a photo detector, a detector block configured wherein the photo detector is disposed on a plane thereof, a filter configured to alter a distribution of infrared light transmitted to the detector block from the sun, a detector cap which is positioned at an uppermost end portion thereof to protect the detector block and the filter and to transmit infrared light, and the like.

In the detector assembly, infrared light is transmitted to the detector cap, the filter, and the photo detector in the provided order from the sun. In the present case, there is a problem in that the quantity of solar radiation is reduced to approximately 25% since the infrared light must penetrate the filter.

Furthermore, there is a problem in that it is necessary to take a longer time period to secure a suitable quantity of solar radiation in a low altitude condition. In other words, when the sun is positioned at an altitude of 5° rather than 10°, a longer time period of approximately 15 to 20 minutes is required.

Furthermore, there is a problem in that a longer time period is required to secure a suitable quantity of solar radiation according to a traveling direction of the vehicle. In other words, when sunlight is radiated to a side of, rather than a front of, the vehicle while the vehicle travels, it may take a longer time.

Furthermore, the detector for detecting solar radiation may be disposed at a upward position to secure the quantity of solar radiation. In the present case, although detecting performance is improved, it may be disadvantageous in external appearance due to an increased protrusion. On the other hand, the detector for detecting solar radiation may be disposed at a downward position to secure the quantity of solar radiation. In the present case, although it is advantageous in external appearance, detecting performance may be deteriorated.

Furthermore, the fixed plate to which the photo detector is disposed may be configured to be inclined. In the present case, it is disadvantageous for miniaturization since a volume of the detector assembly is increased. Furthermore, there is a problem in that the fixed plated is formed to be inclined only in one direction thereof, e.g., forward or backward, (i.e. to be two-dimensionally inclined).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects and exemplary embodiments of the present invention are directed to providing a vehicle detector assembly for detecting solar radiation, which is configured for increasing a quantity of solar radiation reaching a photo detector from the sun with no filter.

Various aspects of the present invention are directed to providing a vehicle detector assembly for detecting solar radiation, which is configured for securing a suitable quantity of solar radiation without increasing a time required for the same in a low altitude condition.

Various aspects of the present invention are directed to providing a vehicle detector assembly for detecting solar radiation, which is configured for securing a suitable quantity of solar radiation regardless of a traveling direction of a vehicle.

Various aspects of the present invention are directed to providing a vehicle detector assembly for detecting solar radiation, which is configured for accomplishing miniaturization without increasing a volume of the vehicle detector assembly while securing a suitable quantity of solar radiation.

A further exemplary embodiment of the present invention is directed to an air conditioning system configured for performing efficient air conditioning by a vehicle detector assembly for detecting solar radiation applied thereto.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, there is provided a vehicle detector assembly for detecting solar radiation, which is configured for increasing a quantity of solar radiation reaching a photo detector from the sun with no filter.

The vehicle detector assembly for detecting solar radiation includes a housing, a fixed plate fixed to an upper surface of the housing in a flat form, a plurality of photo detectors bonded to a surface of the fixed plate, each being connected to a lead having a uniform one-directional inclination structure, and a detector cap fastened to the housing and transmitting sunlight.

The photo detectors may be two photo detectors, and be disposed to be inclined uniformly in left and right directions.

The housing may have a seating groove formed on the upper surface thereof to seat the fixed plate into the seating groove.

Each of the photo detectors may include the lead, a photocell disposed on a surface of the lead, and a molding portion to maintain the uniform one-directional inclination structure of the lead.

The molding portion may be a mold including a transparent material.

The transparent mold may include transparent rigid epoxy.

The photocell may be one of a photodiode, a phototransistor, and a cadmium-sulfide (CdS) device.

Each of the photo detectors may further include a condensing film adhered to an upper surface of the molding portion.

The housing may have separation grooves formed on both sides of a first upper end portion thereof for detachment of the fixed plate or the detector cap.

The housing may have fastening portions formed on both sides of a second upper end portion thereof which are symmetrical to both the sides of the first upper end portion of the housing, and each of the fastening portions may be configured wherein one end portion is integrally formed with the surface of the housing and the other end portion is open and has an elasticity to detach the housing from a dashboard of a vehicle.

The fastening portions may be respectively formed with first protrusions having different inclination angles in upward and downward directions for the housing to be fastened to the dashboard and then fixed thereto.

Both the sides of the first upper end portion of the housing may be formed with second square protrusions for the detector cap to be fastened to the housing and then fixed thereto.

A latch jaw and a plurality of protruding portions may be formed to fix the fixed plate into the seating groove.

The protruding portions may be two protruding portions, and the latch jaw and the protruding portions may be positioned in a triangular form or shape.

The upper surface of the housing may have a polygonal shape.

In accordance with various exemplary embodiments of the present invention, an air conditioning system may include the above-mentioned vehicle detector assembly for detecting solar radiation configured to detect a quantity of solar radiation according to incidence of sunlight and generate an electric signal, a heater controller configured to generate a control signal for controlling an air amount based on the electric signal received from the vehicle detector assembly, and an air conditioning device configured to adjust the air amount based on the control signal.

The air conditioning device may include an air conditioning case in which a duct for circulation of air is disposed, a temperature door formed in the air conditioning case, the temperature door being configured to control a discharging direction of air to change and mix heating air from a heater core and cooling air from an evaporator core at a predetermined rate, a temperature actuator configured to actuate the temperature door, a blower fan configured to discharge the heating air and the cooling air to a provided area through the temperature door, and a blower motor configured to drive the blower fan.

The control signal may be a current amplification signal of the electric signal.

The air conditioning device may be a Heating, Ventilation, and Air Conditioning (HVAC) device.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limited the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

The terms and expressions, including first and/or second, used in the specification of the present invention may be used to describe various elements of the present invention. However, the elements of the present invention should not be limited by the terms used in the specification of the present invention. In other words, such terms will be used only to differentiate one element from other elements of the present invention.

For example, without deviating from the scope and spirit of the present invention, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, including those defined in commonly used dictionaries, should be interpreted as having a meaning which is consistent with their meaning in the context of the relevant art and the present invention, and will not be interpreted in an idealized or overly formal sense unless expressly so defined herein.

Hereinafter, a vehicle detector assembly for detecting solar radiation and an air conditioning system having the same according to exemplary embodiments of the present invention will be described more specifically with reference to the accompanying drawings.

Figure 1:
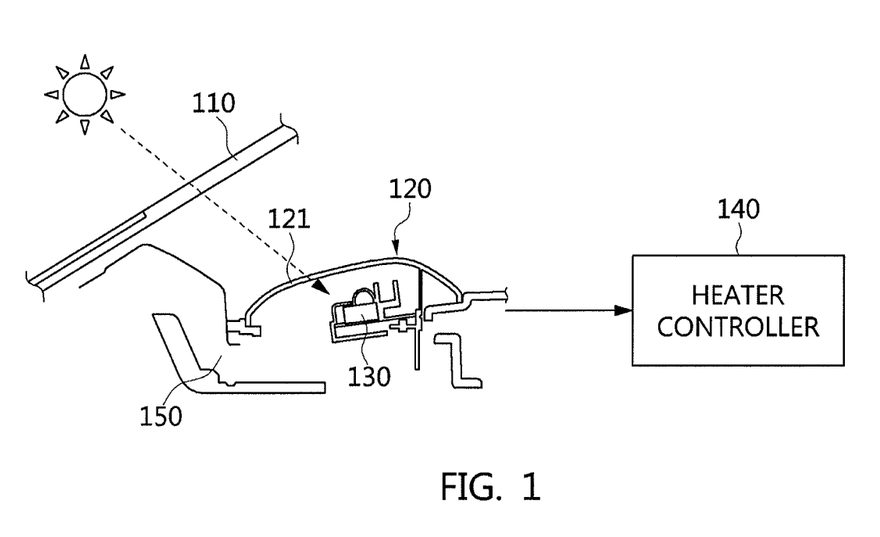
FIG. 1 is a conceptual view illustrating control of solar radiation detection according to an exemplary embodiment of the present invention.

FIG. 1 is a conceptual view illustrating control of solar radiation detection according to an exemplary embodiment of the present invention. Referring to FIG. 1, a detector assembly for detecting solar radiation 120 is disposed on an upper surface of a dashboard 150 to convert a quantity of solar radiation, which is incident through a window glass 110 of a vehicle, into an electric signal.

Only a detector cap 121 of the detector assembly 120 protrudes in external appearance. A detector block 130 is provided in the detector assembly 120 to generate an electric signal. The detector block 130 is assembled to the detector cap 121. Accordingly, the detector assembly 120 generates an electric signal in a response to the quantity of solar radiation and transmits the electric signal to a heater controller 140.

Figure 2:
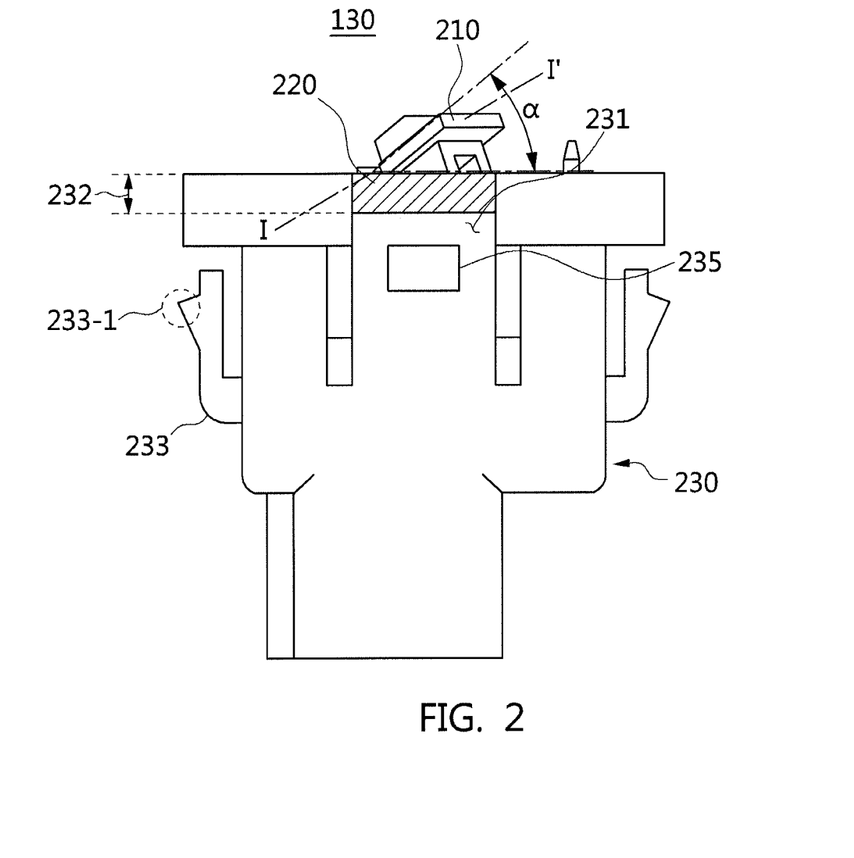
FIG. 2 is a front view of a detector block illustrated in FIG. 1.

FIG. 2 is a front view of the detector block 130 illustrated in FIG. 1. Referring to FIG. 2, the detector block 130 includes a photo detector 210 and a housing 230 which is provided with the photo detector 210.

The photo detector 210 is configured to convert the quantity of solar radiation received thereto into an electric signal. To the present end, the photo detector 210 is inclined uniformly in one direction thereof. That is, the photo detector 210 may be inclined forward or backward thereof. FIG. 2 illustrates that the photo detector 210 has an angle of inclination ($\alpha$) in the forward direction thereof.

The housing 230 is inserted into and fastened to the detector cap 121 on the surface of the dashboard 150. To the present end, the housing 230 has two separation grooves 231 formed on both sides of a first upper end portion thereof, and each of the separation grooves 231 has a certain width and height. As illustrated in FIG. 2, the separation grooves 231 may be formed in the front and rear portions of the housing 230. A fixed plate 220 or the detector cap 121 may be detached through the separation grooves 231.

Additionally, both the sides of the first upper end portion of the housing 230 may be formed with second square protrusions 235 wherein the detector cap 121 and the housing are stably and fixedly fastened to each other.

To fixedly fasten the housing 230 to the dashboard 150 (see FIG. 1), the housing 230 has fastening portions 233 formed on both sides of a second upper end portion thereof which are symmetrical to both the sides of the first upper end portion of the housing 230. In other words, the fastening portions 233 are formed to the left and right of the housing 230 as illustrated in FIG. 2.

Each of the fastening portions 233 is configured wherein one end portion is integrally formed with the surface of the housing 230 and the other end portion is open and has an elasticity, to detach the housing 230 from the dashboard 150 of the vehicle. Accordingly, after the fastening portions 233 are pressed inward when the housing 230 is inserted downwardly into the dashboard 150, the fastening portions 223 are restored again.

The fastening portions 233 may be respectively formed with first protrusions 233-1 having different inclination angles in upward and downward directions for the housing 230 to be fastened to the dashboard 150 and then fixed thereto.

The fixed plate 220 is inserted into and accommodated to a seating groove 231 formed on the upper surface of the housing 230. To the present end, the seating groove 231 has a predetermined depth. The fixed plate 220 may include a conductive material to be connected to the photo detector 210 and a lead 320 (see FIG. 3). A wire connected to the lead, a connector, etc. may be disposed in the housing 230.

Figure 3:
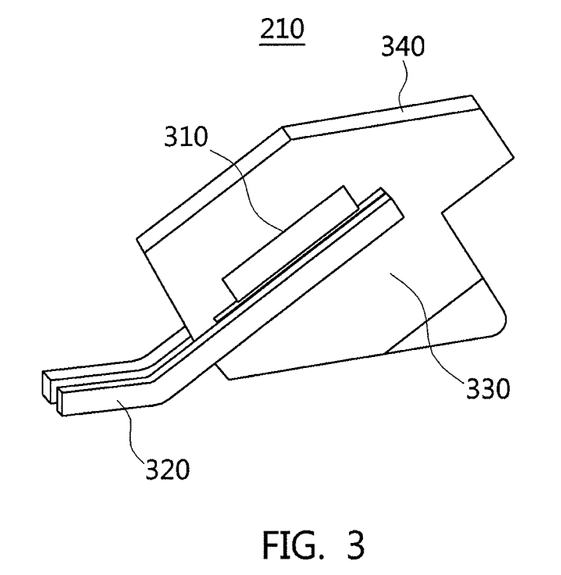
FIG. 3 is a cross-sectional view of a photo detector taken along line I-P of FIG. 2.

FIG. 3 is a cross-sectional view of the photo detector 210 taken along line I-I' of FIG. 2. Referring to FIG. 3, the lead 320 is inclined in one direction thereof. In other words, the gradient of the lead 320 is increased from the left end portion of the lead 320 to the right end portion thereof. Accordingly, the lead 320 is uniformly inclined. That is, the left end portion of the lead 320 is bonded to the fixed plate 220, and a photocell 310 is attached to the surface of the right end portion of the lead 320, a molding portion 330 is formed to surround the lead 320 and maintain the one-directional inclination of the lead 320. The molding portion 330 is a mold including a transparent material configured to transmit sunlight. The transparent mold may include transparent rigid epoxy, transparent rigid urethane, or the like.

In other words, when transparent rigid epoxy is poured over the lead 320 after the attachment of the photocell 310 thereto and a predetermined time period elapses, the one-directional inclination of the lead 320 is configured to be constantly maintained.

Although a photodiode is mainly used as the photocell 310, the present invention is not limited thereto. For example, a phototransistor or a CdS device may be used.

Furthermore, a condensing film 340 may be further adhered to the upper surface of the molding portion 330 to concentrate sunlight incident thereon. The condensing film 340 is configured to collect sunlight, which is incident in various directions, in a certain direction and emit the sunlight. The condensing film 340 may be an ultrathin film.

Figure 4:
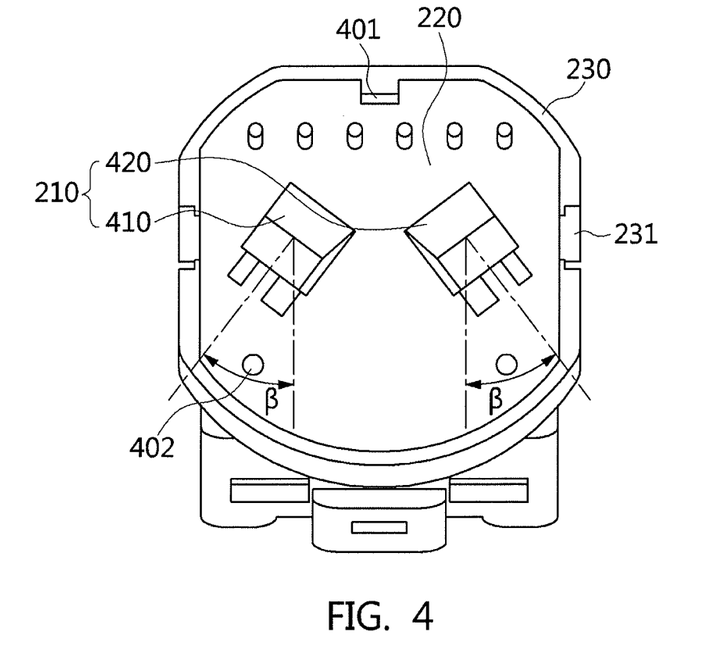
FIG. 4 is a view illustrating photo detectors, which are inclined in left and right directions, according to another exemplary embodiment of the present invention.

FIG. 4 is a view illustrating photo detectors, which are inclined in left and right directions, according to another exemplary embodiment of the present invention. In other words, FIG. 4 is a top view illustrating the detector block 130 of FIG. 2. Referring to FIG. 4, first and second photo detectors 410 and 420 are disposed at a predetermined distance on the surface of a fixed plate 220 while having uniform inclination angles ($\beta$) in the left and right directions.

Furthermore, a latch jaw 401 and a plurality of protruding portions 402 may be formed to fix the fixed plate 220 into a seating groove 231 formed on the upper surface of a housing 230. The latch jaw 401 and the protruding portions 402 may be positioned in a triangular form or shape.

Although the upper surface of the housing 230 has a square shape having rounded edge portions, the present invention is not limited thereto. For example, the upper surface of the housing 230 may have various shapes including a polygonal shape.

Figure 5:
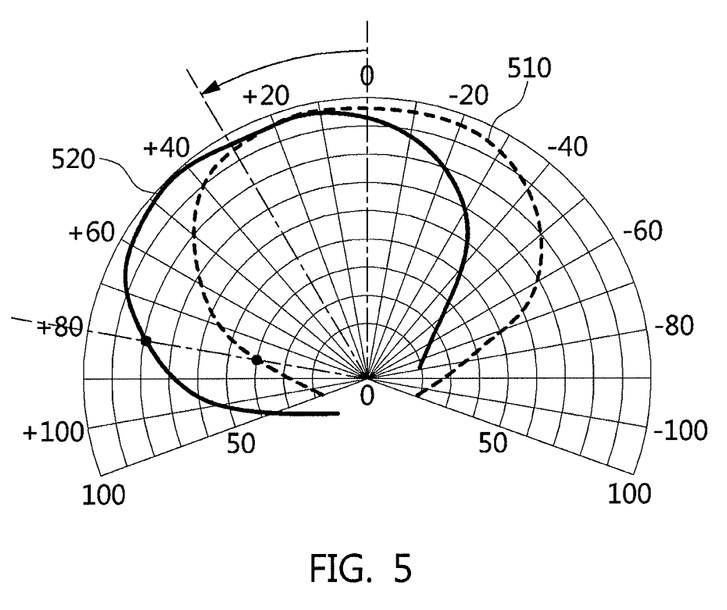
FIG. 5 is a graph illustrating detecting performance for each angle according to the exemplary embodiments of the present invention.

FIG. 5 is a graph illustrating detecting performance for each angle according to the exemplary embodiments of the present invention. FIG. 5 illustrates a typical detecting performance curve 510 for each angle of a photo detector and a detecting performance curve 520 for each angle of a photo detector according to the exemplary embodiments of the present invention. In other words, the detecting performance of sunlight is improved at a low altitude. The detecting performance is improved when the performance curve is moved to the left.

Figure 6:
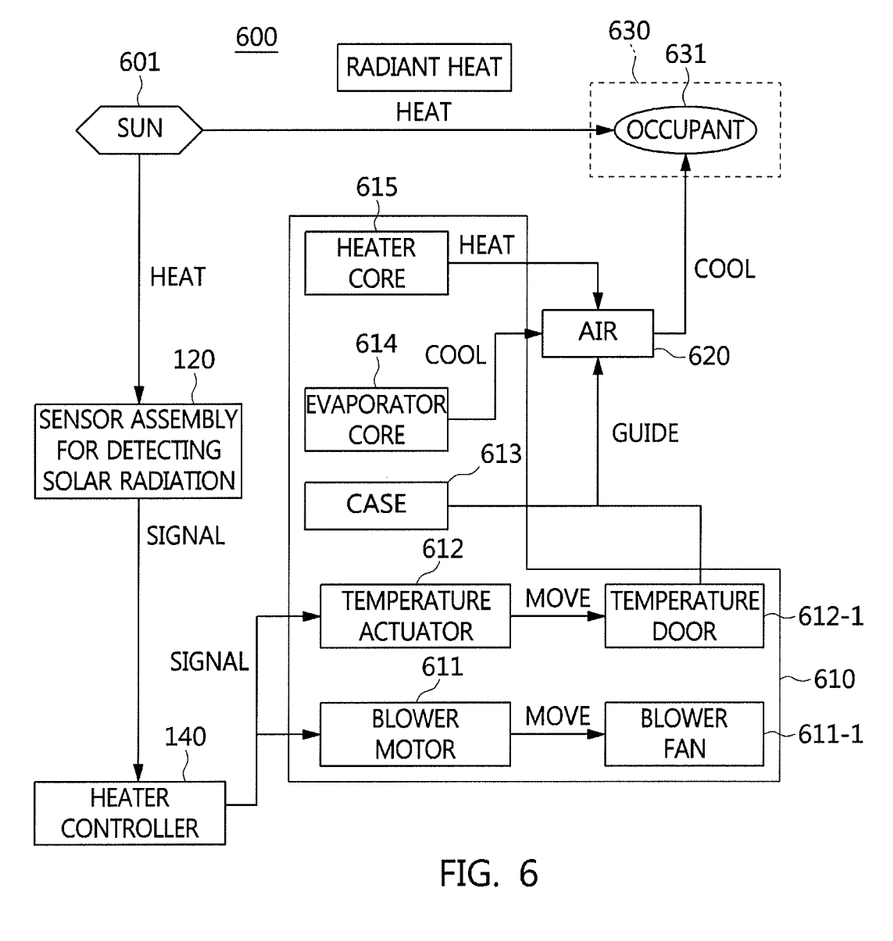
FIG. 6 is a diagram illustrating an air conditioning system according to a further exemplary embodiment of the present invention.

FIG. 6 is a diagram illustrating an air conditioning system according to a further exemplary embodiment of the present invention. Referring to FIG. 6, the air conditioning system, which is designated by reference numeral 600, may include the vehicle detector assembly for detecting solar radiation 120 that detects a quantity of solar radiation according to the incidence of sunlight from the sun 601 and generates an electric signal, the heater controller 140 configured to generate a control signal for controlling an air amount based on the electric signal received from the vehicle detector assembly 120, an air conditioning device 610 that adjusts the air amount based on the control signal, etc.

The heater controller 140 is configured to convert the electric signal into a current amplification signal and transmits the current amplification signal to a temperature actuator 612, a blower motor 611, and the like.

The air conditioning device 610 may be a Heating, Ventilation, and Air Conditioning (HVAC) device.

Furthermore, the air conditioning device 610 may include an air conditioning case 613 in which a duct for circulation of air is disposed, a temperature door 612-1 which is formed in the air conditioning case 613 and controls a discharging direction of air to change and mixes heating air from a heater core 615 and cooling air from an evaporator core 614 at a predetermined rate, a temperature actuator 612 that actuates the temperature door 612-1, a blower fan 611-1 that discharges the heating air and the cooling air to a provided area through the temperature door 612-1, a blower motor 611 that drives the blower fan 611-1, etc.

The air conditioning device 610 is a typical device that selects external air or internal air and heats or cools the selected air to blow the heated or cooled air to a vehicle internal, to heat or cool the vehicle internal. The air conditioning device 610 includes the evaporator core 614, the heater core 615, the blowing devices 611, 611-1, 612, and 612-1, etc.

According to the positioning of three components including the blowing device 611, 611-1, 612, or 612-1, the evaporator core 614, and the heater core 615, the air conditioning device 610 may be classified into a three-piece type air conditioning device in which the given components are provided independently, a semi-center type air conditioning device in which the evaporator core and the heater core are provided in the air conditioning case and the blower device is provided separately, and a center mounting type air conditioning device in which the three components are provided in the air conditioning case. However, the present invention is not limited thereto.

The temperature door 612-1 is mounted in the air conditioning case 613 to be openable or closable about a fixed hinge point, and is configured to guide cooling air or heating air to the vehicle internal. That is, the temperature door 612-1 is mounted between the evaporator core 614 and the heater core 615 and is variably controlled in position to mix cooing air and heating air at a predetermined rate.

In accordance with exemplary embodiments of the present invention, it is possible to increase a quantity of solar radiation reaching a photo detector from the sun with no filter by application of a transparent mold to a vehicle detector assembly.

Furthermore, it is possible to secure a suitable quantity of solar radiation without increasing the time required for the same in a low altitude condition by application of an inclined structure to a lead to which the photo detector is disposed.

Furthermore, since the photo detector and the lead are disposed to be three-dimensionally inclined, i.e. to be inclined in left and right directions as well as in forward and backward directions, it is possible to secure a suitable quantity of solar radiation regardless of the traveling direction of the vehicle.

Furthermore, it is possible to reduce the size of the vehicle detector assembly without increasing the volume thereof and to secure a suitable quantity of solar radiation.

Furthermore, it is possible to reduce the size and weight of the vehicle detector assembly since the vehicle detector assembly transmits sunlight while the inclination angles of the photo detector and the lead are maintained.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle detector assembly for detecting solar radiation, the vehicle detector assembly comprising:
a housing;
a fixed plate fixed to an upper surface of the housing in a flat form;
a plurality of photo detectors bonded to a surface of the fixed plate, each being connected to a lead having a uniform one-directional inclination structure in which the surface of the fixed plate is inclined from a horizontal direction; and
a detector cap fastened to the housing and configured for transmitting sunlight,
wherein each of the photo detectors includes:
the lead;
a photocell disposed on a surface of the lead; and
a molding portion configured to maintain the uniform one-directional inclination structure of the lead,
wherein the housing has a seating groove formed on the upper surface thereof to accommodate the fixed plate into the seating groove, and
wherein a latch jaw and a plurality of protruding portions are formed to fix the fixed plate into the seating groove.

2. The vehicle detector assembly of claim 1, wherein the plurality of photo detectors are two photo detectors, and are disposed to be inclined uniformly in first and second directions thereof.

3. The vehicle detector assembly of claim 1, wherein the molding portion is a mold including a transparent material.

4. The vehicle detector assembly of claim 3, wherein the mold includes transparent rigid epoxy.

5. The vehicle detector assembly of claim 1, wherein the photocell is a photodiode, a phototransistor, or a cadmium-sulfide (CdS) device.

6. The vehicle detector assembly of claim 1, wherein each of the photo detectors further includes a condensing film adhered to an upper surface of the molding portion.

7. The vehicle detector assembly of claim 1, wherein the housing has separation grooves formed on a first side and a second side of a first upper end portion thereof for detachment of the fixed plate or the detector cap.

8. The vehicle detector assembly of claim 7, wherein the housing has fastening portions formed on a first side and a second side of a second upper end portion thereof which are symmetrical to the first side and the second side of the first upper end portion of the housing, and each of the fastening portions is configured such that a first end portion is integrally formed with a surface of the housing and a second end portion is open and has an elasticity to allow detaching the housing from a dashboard of a vehicle.

9. The vehicle detector assembly of claim 8, wherein the fastening portions are respectively formed with first protrusions having different inclination angles in upward and downward directions allowing for the housing to be fastened to the dashboard and then fixed thereto.

10. The vehicle detector assembly of claim 7, wherein the first side and the second side of the first upper end portion of the housing are formed with square protrusions allowing for the detector cap to be fastened to the housing and then fixed thereto.

11. The vehicle detector assembly of claim 1, wherein the protruding portions are two protruding portions, and the latch jaw and the protruding portions are disposed in a triangular form or shape.

12. The vehicle detector assembly of claim 1, wherein the upper surface of the housing has a polygonal shape.

13. An air conditioning system comprising:
the vehicle detector assembly for detecting solar radiation of claim 1, wherein the vehicle detector assembly is configured to detect a quantity of the solar radiation according to an incidence of sunlight and generate an electric signal therefrom;
a heater controller configured to generate a control signal for controlling an air amount based on the electric signal received from the vehicle detector assembly; and
an air conditioning device configured to adjust the air amount based on the control signal.

14. The air conditioning system of claim 13, wherein the air conditioning device includes:
an air conditioning case in which a duct for circulation of air is disposed;
a temperature door formed in the air conditioning case, the temperature door being configured to control a discharging direction of air to change and mix heating air from a heater core and cooling air from an evaporator core at a predetermined rate;
a temperature actuator configured to actuate the temperature door;
a blower fan configured to discharge the heating air and the cooling air to a predetermined area through the temperature door; and
a blower motor configured to drive the blower fan.

15. The air conditioning system of claim 13, wherein the control signal is a current amplification signal of the electric signal.

16. The air conditioning system of claim 13, wherein the air conditioning device is a Heating, Ventilation, and Air Conditioning (HVAC) device.

* * * * *